US011454053B2

(12) United States Patent
Sukumar

(10) Patent No.: US 11,454,053 B2
(45) Date of Patent: Sep. 27, 2022

(54) MULTIDIRECTIONAL OPENING STORAGE COVER WITH INVISIBLE LATCH

(71) Applicant: GM GLOBAL TECHNOLOGY OPERATIONS LLC, Detroit, MI (US)

(72) Inventor: Nithish Sukumar, Karur (IN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 625 days.

(21) Appl. No.: 16/559,305

(22) Filed: Sep. 3, 2019

(65) Prior Publication Data

US 2021/0062557 A1    Mar. 4, 2021

(51) Int. Cl.
*B60R 7/04* (2006.01)
*E05B 83/32* (2014.01)
*E05D 7/10* (2006.01)
*E05B 81/04* (2014.01)
*E05B 81/08* (2014.01)

(52) U.S. Cl.
CPC ............... *E05B 83/32* (2013.01); *B60R 7/04* (2013.01); *E05B 81/04* (2013.01); *E05D 7/10* (2013.01); *E05B 81/08* (2013.01); *E05Y 2900/538* (2013.01)

(58) Field of Classification Search
CPC .......... E05B 83/32; E05B 81/04; E05B 81/08; B60R 7/04; E05D 7/10; E05Y 2900/538
USPC .............................................. 296/24.38, 37.8
See application file for complete search history.

(56) References Cited

U.S. PATENT DOCUMENTS

| | | | | |
|---|---|---|---|---|
| 6,761,278 | B2* | 7/2004 | Hyp | B60R 7/04 220/259.2 |
| 6,832,815 | B2* | 12/2004 | O'Connor | B60N 2/20 297/378.12 |
| 7,686,364 | B2* | 3/2010 | Hehn | E05D 15/502 220/817 |
| 8,847,760 | B1* | 9/2014 | Watkins, Jr. | A45C 13/18 340/568.1 |
| 9,169,674 | B2* | 10/2015 | Bruening | E05B 77/06 |
| 10,328,864 | B2* | 6/2019 | Yoshida | B60R 7/04 |
| 10,906,469 | B2* | 2/2021 | Smolik | B60N 2/793 |
| 11,338,363 | B2* | 5/2022 | Erickson | B29C 64/165 |
| 11,338,717 | B2* | 5/2022 | Hodge | B60P 3/0257 |
| 2003/0197392 | A1* | 10/2003 | Clark | B60R 7/04 296/24.34 |
| 2006/0131913 | A1* | 6/2006 | Herferich | E05D 15/582 296/37.1 |
| 2009/0002590 | A1* | 1/2009 | Kimura | H01L 27/1292 438/151 |

(Continued)

*Primary Examiner* — Pinel E Romain
(74) *Attorney, Agent, or Firm* — Lorenz & Kopf LLP

(57) ABSTRACT

Method and apparatus are provided for a multidirectional opening storage cover. The apparatus includes a storage cover having a right side, a left side, a front side, and a rear side, a first latch on the left side of the storage cover, a second latch on the front side of the storage cover, a third latch on the right side of the storage cover, a fourth latch on the rear side of the storage cover, a first switch on the left side of the storage cover operative to disengage the first latch, second latch and fourth latch in response to an activation of the first switch by a user, and a second switch on the right side of the storage cover operative to disengage the second latch, the third latch and the fourth latch in response to an activation of the second switch by the user.

18 Claims, 7 Drawing Sheets

(56) References Cited

U.S. PATENT DOCUMENTS

| | | | |
|---|---|---|---|
| 2009/0218361 A1* | 9/2009 | Dammers | E05D 15/502 |
| | | | 220/817 |
| 2013/0257079 A1* | 10/2013 | Donovan | B60R 21/026 |
| | | | 296/24.43 |
| 2014/0291372 A1* | 10/2014 | Smith | B60R 7/04 |
| | | | 224/539 |
| 2015/0137546 A1* | 5/2015 | Gaudig | E05D 7/1077 |
| | | | 296/37.12 |
| 2016/0024816 A1* | 1/2016 | Simon | E05B 83/32 |
| | | | 292/195 |
| 2018/0022281 A1* | 1/2018 | Hatakeyama | E05D 15/50 |
| | | | 220/811 |
| 2019/0063132 A1* | 2/2019 | Ike | E05D 15/502 |
| 2019/0126796 A1* | 5/2019 | Yamazaki | B60R 7/04 |
| 2022/0010599 A1* | 1/2022 | Dalton | E05B 81/08 |
| 2022/0126750 A1* | 4/2022 | Vorac | B60R 7/06 |

\* cited by examiner

100

300

MULTIDIRECTIONAL OPENING STORAGE COVER WITH INVISIBLE LATCH

INTRODUCTION

The present disclosure relates generally to a system for configuring a storage cover within a motor vehicle. More specifically, aspects of the present disclosure relate to systems, methods and devices for enabling an armrest storage cover within a vehicle cabin to have multi-directional opening capabilities and having a hidden latching and hinge mechanism.

Meeting customer demands for new and innovative motor vehicle features are increasingly important for vehicle manufacturers. One such important feature is vehicle cabin storage. With the increased assisted driving capabilities projected for future vehicles, increased cabin storage will be even more in demand. A problem with current in cabin storage solutions is that they are usually accessible to only one vehicle occupant. For example, the glove box is only accessible to the front seat passenger and the center console storage door generally opens towards the driver and is therefore difficult to access by the front seat passenger and impossible to access by a rear seat passenger. It would be desirable to provide vehicle in-cabin storage that is accessible by more vehicle occupants to overcome the aforementioned problems.

The above information disclosed in this background section is only for enhancement of understanding of the background of the invention and therefore it may contain information that does not form the prior art that is already known to a person of ordinary skill in the art.

SUMMARY

Disclosed herein are methods and systems and related control logic for provisioning vehicle cabin interior components, methods for making and methods for operating such components, and motor vehicles equipped with such features and components. By way of example, and not limitation, there is presented various embodiments of configuring a vehicle storage compartment in a motor vehicle, and a method for providing access to a vehicle storage compartment within a vehicle cabin are disclosed herein.

In accordance with an aspect of the present invention an apparatus includes a storage cover having a right side, a left side, a front side, and a rear side, a first latch on the left side of the storage cover, a second latch on the front side of the storage cover, a third latch on the right side of the storage cover, a fourth latch on the rear side of the storage cover, a first switch on the left side of the storage cover operative to disengage the first latch, second latch and fourth latch in response to an activation of the first switch by a user, a second switch on the right side of the storage cover operative to disengage the second latch, the third latch and the fourth latch in response to an activation of the second switch by the user.

In accordance with another aspect of the present invention the storage cover is operative to rotate around the third latch in response to the disengagement of the first latch, the second latch and the fourth latch.

In accordance with another aspect of the present invention the storage cover is operative to rotate around the first latch in response to the disengagement of the third latch, the second latch and the fourth latch.

In accordance with another aspect of the present invention the storage cover further includes an armrest and wherein the storage cover is in a vehicle cabin.

In accordance with another aspect of the present invention the wherein activation of the first switch is operative to retract a first latch pin within the first latch, a second latch pin within the second latch and a fourth latch pin within the fourth latch and the storage cover being operative to rotate on a third latch pin within the third latch.

In accordance with another aspect of the present invention the storage cover is part of a storage compartment located within a center console in a vehicle cabin.

In accordance with another aspect of the present invention that apparatus further includes a power supply for providing an electrical current and wherein the electrical current is coupled to the first latch, second latch and fourth latch in response to the activation of the first switch.

In accordance with another aspect of the present invention the apparatus further includes an electrical coupler between a vehicle center console and the storage cover for coupling an electrical current to the first switch and the second switch.

In accordance with another aspect of the present invention wherein the first switch comprises a strap switch positioned under a material covering on the storage cover.

In accordance with another aspect of the present invention a method includes receiving user input via a switch on a first side of a storage compartment lid, and disengaging a first latch on the first side of the storage compartment lid, a second latch on a second side of the storage compartment lid and a third latch on a third side of the storage compartment lid in response to the user input, wherein the storage compartment lid is operative for a hinged rotation on a fourth side of the storage compartment lid.

In accordance with another aspect of the present invention the method further includes reengaging the first latch, second latch and third latch in response to a user closing the storage compartment lid.

In accordance with another aspect of the present invention the storage containment lid is part or a storage compartment within a vehicle cabin.

In accordance with another aspect of the present invention the switch is a strap switch located within the storage compartment lid.

In accordance with another aspect of the present invention disengaging the first latch includes retracting a first latch pin and a second latch pin in response to the user input.

In accordance with another aspect of the present invention the switch is operative to couple an electrical current to the first latch, the second latch and the third latch in response to the user input.

In accordance with another aspect of the present invention the switch is operative to couple an electrical current from a power supply to the first latch, the second latch and the third latch in response to the user input.

In accordance with another aspect of the present invention a storage compartment cover for use within a vehicle cabin includes a first switch on a first side of the storage compartment cover, a first latch on the first side of the storage compartment cover, a second latch on a second side of the storage compartment cover, a third latch on a third side of the storage compartment cover, a fourth latch on a fourth side of the storage compartment cover, and a power supply for suppling a voltage to the first latch, the second latch and the third latch in response to an activation of the first switch and wherein the storage compartment cover is operative to rotate around the fourth latch in response to a disengagement of the first latch, the second latch, and the third latch in response to the voltage.

In accordance with another aspect of the present invention the voltage is coupled from the power supply to the first latch, the second latch and the third latch from a vehicle center console to the storage compartment cover via an electrical coupler.

In accordance with another aspect of the present invention the first switch is a strap switch located within the storage compartment cover.

In accordance with another aspect of the present invention the first latch is disengaged by retracting a latch pin in response to the voltage.

The above advantage and other advantages and features of the present disclosure will be apparent from the following detailed description of the preferred embodiments when taken in connection with the accompanying drawings.

BRIEF DESCRIPTION OF THE DRAWINGS

The exemplary embodiments will hereinafter be described in conjunction with the following drawing figures, wherein like numerals denote like elements, and wherein.

The exemplifications set out herein illustrate preferred embodiments of the invention, and such exemplifications are not to be construed as limiting the scope of the invention in any manner.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description.

Figure 1:
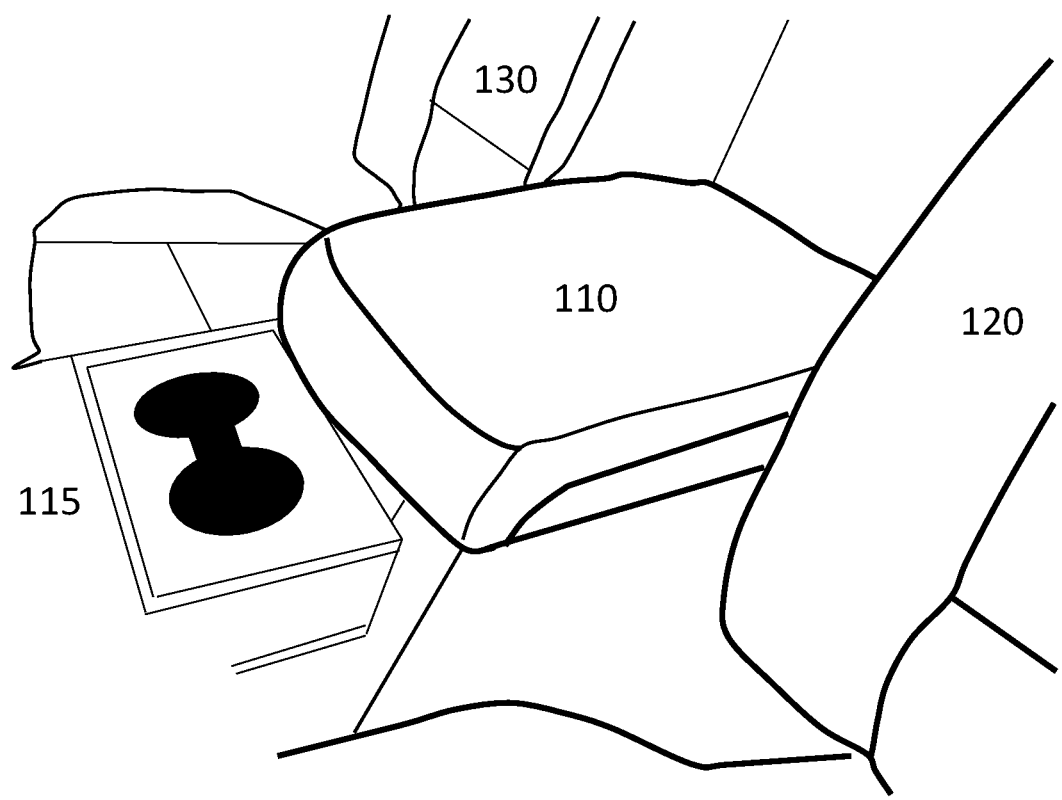
FIG. 1 shows an application for the method and apparatus for multidirectional opening storage cover according to an exemplary embodiment of the present disclosure.

Turning now to FIG. 1, an environment 100 for a multidirectional opening storage cover with invisible latch according to an exemplary embodiment of the present disclosure is shown. The exemplary environment 100 is illustrative of a front seat area of a vehicle cabin, having a driver's seat 120, a passenger's seat 130, and a center console unit 115 having an armrest storage door 110. While the present exemplary embodiment describes a vehicle cabin, the environment may be any other applicable application.

In this exemplary embodiment, the currently disclosed hinge and latch mechanism that enables armrest storage door 110 to have 4 directional opening which enables the occupant to open the armrest storage door 110 with a gentle touch on a particular zone of the armrest storage door 110. In this exemplary configuration, rear seat passengers can access the armrest storage compartment without any restriction. In addition, the driver and passenger in the front seats may also easily open the armrest storage door 110 based on their accessibility.

In this exemplary configuration of the armrest storage door 110, pivots are provided to function as both hinges and latches. Latch buttons are provided on each of the four sides of the armrest storage door 110 which enable actuation of three side latches when 1 button is pressed. In an exemplary embodiment, latch buttons are strap shaped electrical push button and with the armrest storage door 110 having an electrical contact design for communication between door and console. The latch mechanism may utilize an electromagnetic coil arrangement or any form of actuation medium, such as piezo or pneumatic.

In another aspect of an exemplary configuration, the hinge mechanism may include a torsional spring and rotational damper packaging. The hinge mechanism may further include a square slot provided to accommodate a square section pins that may be engaged by pins while latched. In an exemplary configuration, the square section pin may be part of armrest storage door 110. In addition, a small toothed clutch facing may be employed in the torsional spring a rotational damper packaging to prevent the torsional spring from unloading when the latch is released.

Figure 2A:
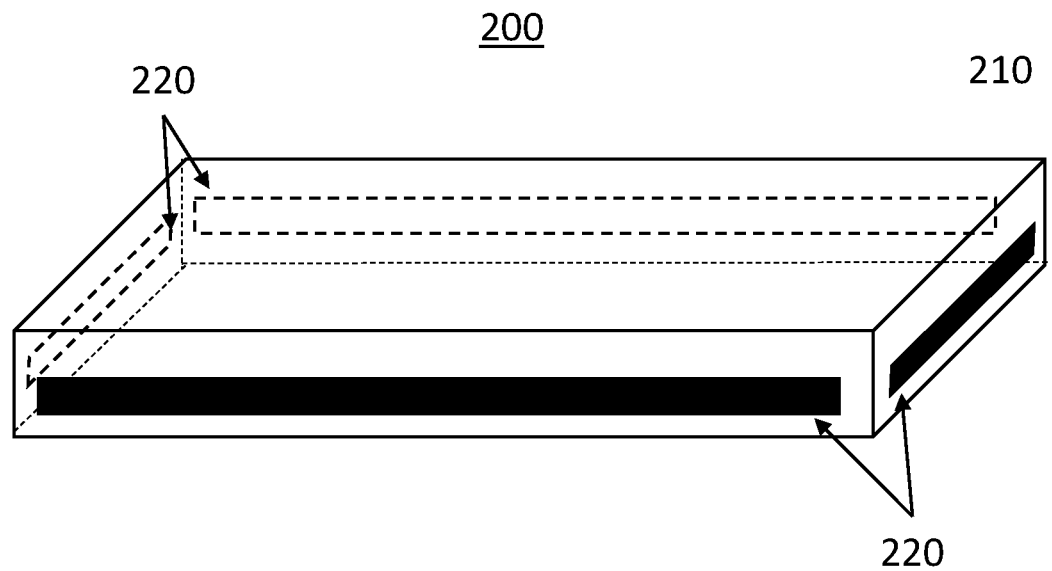
FIG. 2a shows a multidirectional opening storage cover according to an exemplary embodiment of the present disclosure.

Turning now to FIG. 2a, an exemplary multidirectional opening storage cover with invisible latch 200 according to an exemplary embodiment of the present disclosure is shown. The multidirectional opening storage cover 200 includes a cover 210 and a plurality of switches 220. In FIG. 2a, two switches 220 are shown on the proximate two sides of the cover 210 with solid lines and two switches 220 shown on the distal sides are shown with broken lines. In the exemplary embodiment, each side the cover 210 is provided with a switch 220 operative to engage and disengage a plurality of latches/hinges. In an exemplary embodiment, a switch 220 is placed on each of the four sides of the cover 210. When a switch 220 is depressed by the vehicle occupant, an electrical current coupled is coupled to a plurality of latches such that the cover 210 is operative to open to the side of the depressed switch 220.

Figure 2B:
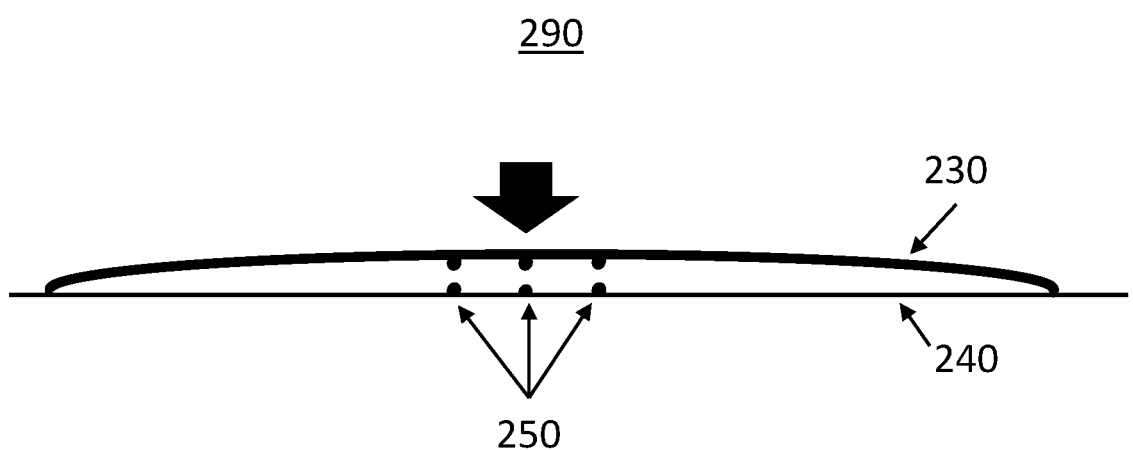
FIG. 2b shows a strap switch for use in a multidirectional opening storage cover according to an exemplary embodiment of the present disclosure.

Turning now to FIG. 2b, profile view of an exemplary strap switch 290 according to an exemplary embodiment of the present disclosure is shown. The exemplary strap switch 290 may be formed by one rigid strap portion 240 and a flexible strap portion 230. Each of the flexible strap portion 230 and the rigid strap portion 240 are provided with conductive contacts 250 positioned such that when the flexible strap portion 230 is depressed by a lateral force, depicted as the solid arrow, the conductive contacts 250 are connected and form an electrical link. This electrical link through these conductive contacts 250 is operative to engage and disengage a plurality of hinge/latch mechanisms within the exemplary storage compartment. In an alternative exemplary embodiment, the strap switch 290 forms an electrical switch including a curve shaped thin contact blade of uniform cross section, which is closely packed and another straight contact plate is packed behind the curve shaped blade. When the curve blade is actuated, it bends and thus touches with the straight contact plate. This makes an electrical connection between the curve shaped thin contact blade and the straight contact plate used to actuate a plurality of latch mechanisms. The contact blade and the contact plate may be connected to one or more terminals at the bottom face of the cover for communication with the compartment and further control systems.

Figure 3:
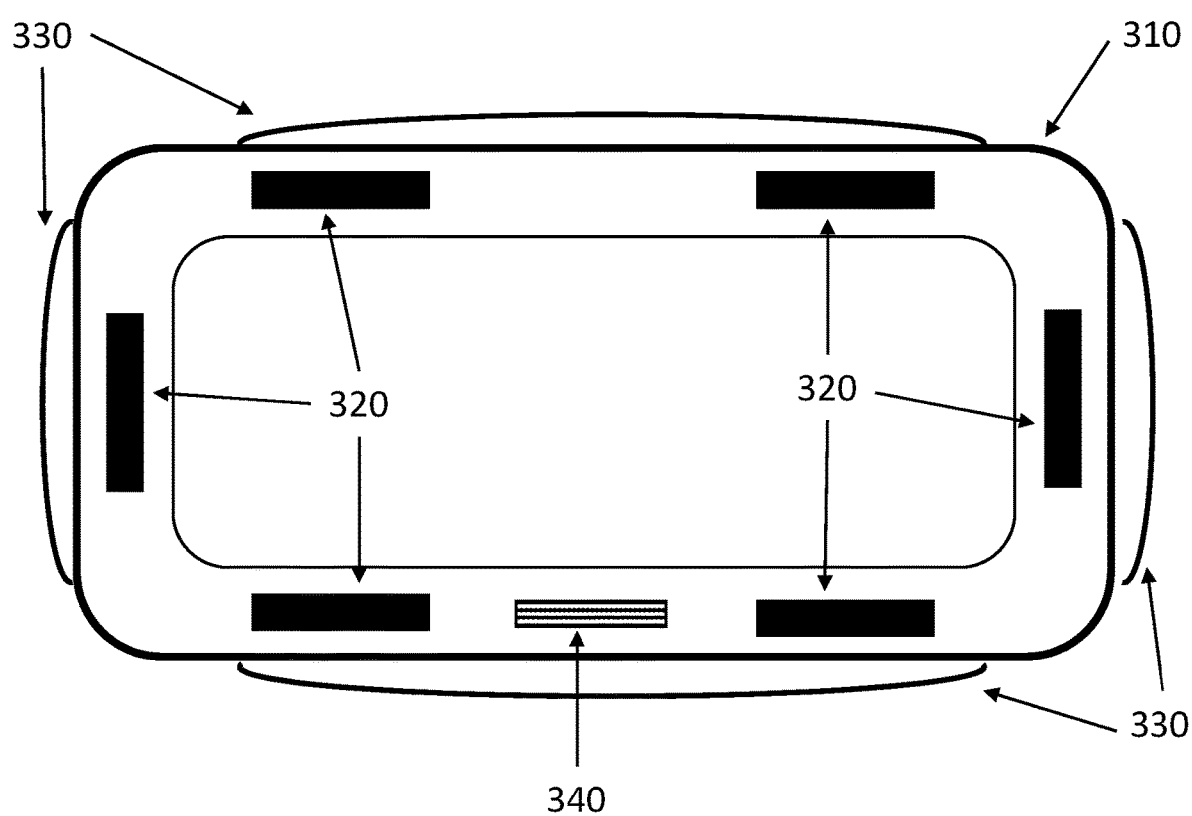
FIG. 3 shows a bottom view of a multidirectional opening storage cover according to an exemplary embodiment of the present disclosure.

Turning now to FIG. 3, a bottom view of an exemplary multidirectional opening storage cover 300 according to an exemplary embodiment of the present disclosure is shown. In this exemplary embodiment the storage cover 310 is shown from the bottom side. The storage cover is equipped with a plurality of latches 320 wherein the latches may further operate as hinges for the storage cover 310. A plurality of exemplary strap switches 330 are also shown with one strap switch 330 positioned on each side of the storage cover 310. Any number of latch mechanisms may be supplied to each side of the storage cover 310. In this exemplary embodiment, two latches are shown on two sides and one latch is shown on two sides. However, multiple latches may be utilized on any side wherein the latches on each side are disengaged and engaged concurrently to function to enable the storage cover 310 to rotate around the same axis. In this exemplary embodiment, 320 may alternately be pivot points and not latches. The latch may be provided at the storage cabin and the corresponding square holes in the storage cover as the integration of an electromagnetic coil in storage cover will increase the weight and the complexity of electrical connections.

An electrical connector 340 is further shown on the underside of the storage cover 310. The electrical connector 340 may be a plurality of electrical contacts, a magnetic electrical coupling, or any other detachable electrical conductor. Here the electrical contacts may establish connection from storage cabin to the cover for the strap switch's actuation signal communication. In an exemplary implementation, an electrical connection established between the storage cover 310 and a storage compartment body through the electrical connector 340. When one of the strap switches 330 is depressed and an electrical connection made at the strap switch, an electrical current is conducted through the electrical connector 340. In response to the electrical current, all of the latches 320 are released except the latches 320 on the side opposite of the depressed strap switch 330 facilitating the storage cover 310 to be hinged on the side opposite the depressed strap switch 330.

Figure 4:
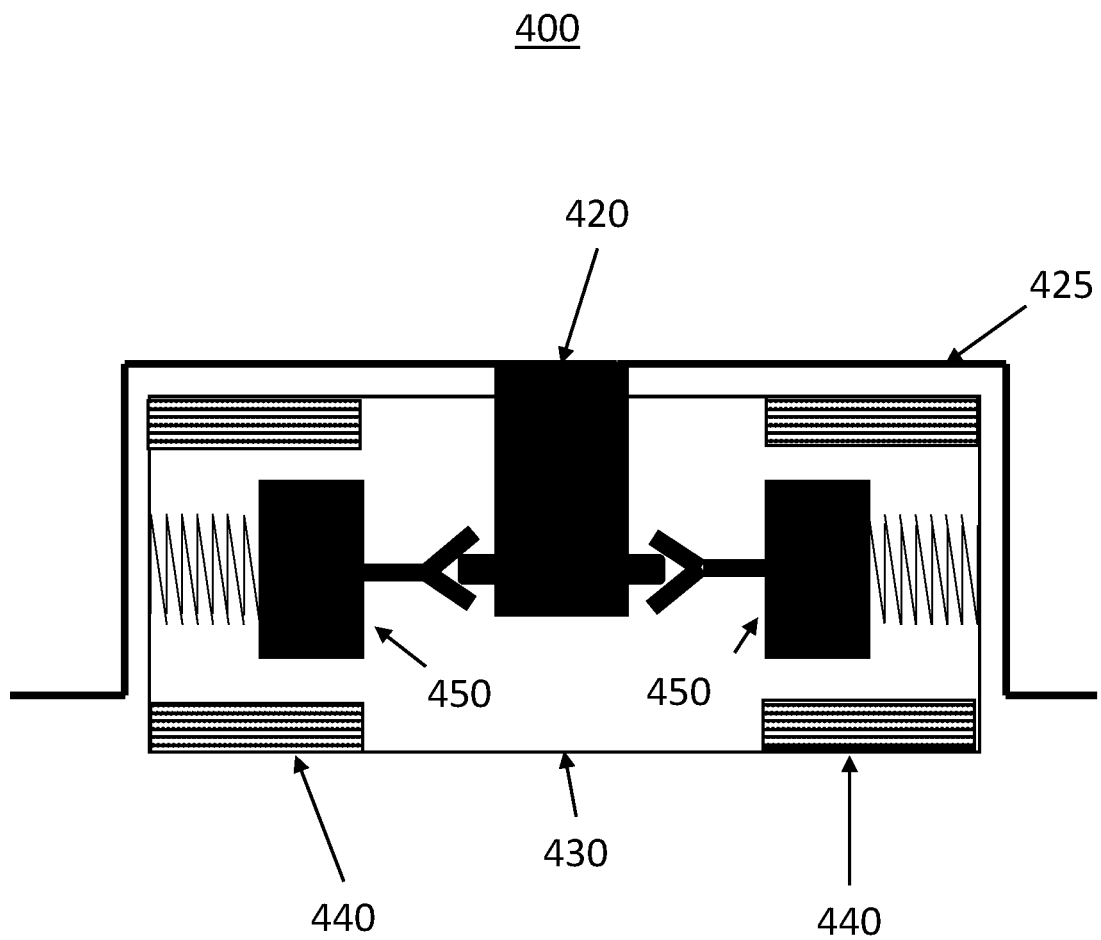
FIG. 4 shows an exemplary latch mechanism for multidirectional opening storage cover according to another exemplary embodiment of the present disclosure.

Turning now to FIG. 4, an exemplary latch mechanism 400 according to an exemplary embodiment of the present disclosure is shown. The exemplary latch mechanism 400 is operative to function as a latch and a hinge to accommodate hinged opening of the storage compartment. A rectangular portion 430 of the latch is attached to the storage compartment wall and engages a rectangular slot 425 in the storage compartment cover. Within the rectangular slot 425 is a structure 420 extended from the bottom of the rectangular slot 425. The structure 420 further includes two laterally extended features for engaging two latch pins 450 housed in the rectangular structure 430, one on each side of the structure 420. The latch pins 450 are operative to be retracted in response to a depression of one of the strap switches. In an exemplary embodiment, the latch pins 450 may be retracted by a force provided by one or more magnetic coils. 449.

When one strap switch is depressed on the exemplary storage cover, the latch mechanisms on the same side as the strap switch as well as the two adjacent sides are disengaged. The latch mechanisms on the opposite side of the strap switch are not operative to disengage and the closed latch pins 450 and the laterally extended features of the structure 420 are unobstructed in a rotational manner and therefore act as hinges and hinge pings for the storage cover. In an additional exemplary embodiment, the hinge mechanism may include a limit switch, toothed clutch, or other variants.

In another exemplary embodiment, a simple mechanism is applied in the latch to retract latching pins when the strap button is pressed. The rectangular portion 430 is allowed to engage with the rectangular slot 420 provided in the hinge mechanism. A toothed clutch may be used to prevent the unloading of torsional spring when the latch is opened.

When the strap button is pressed, the latch pins 450 are retracted away from the laterally extended features and then the torsional spring gets arrested in the toothed clutch due to spring load. This action will occur at pressed and adjacent latches. When the storage is force closed, a ball tip of the laterally extended features will slide past the latch pins 450 and be returned to the latched position.

Figure 5:
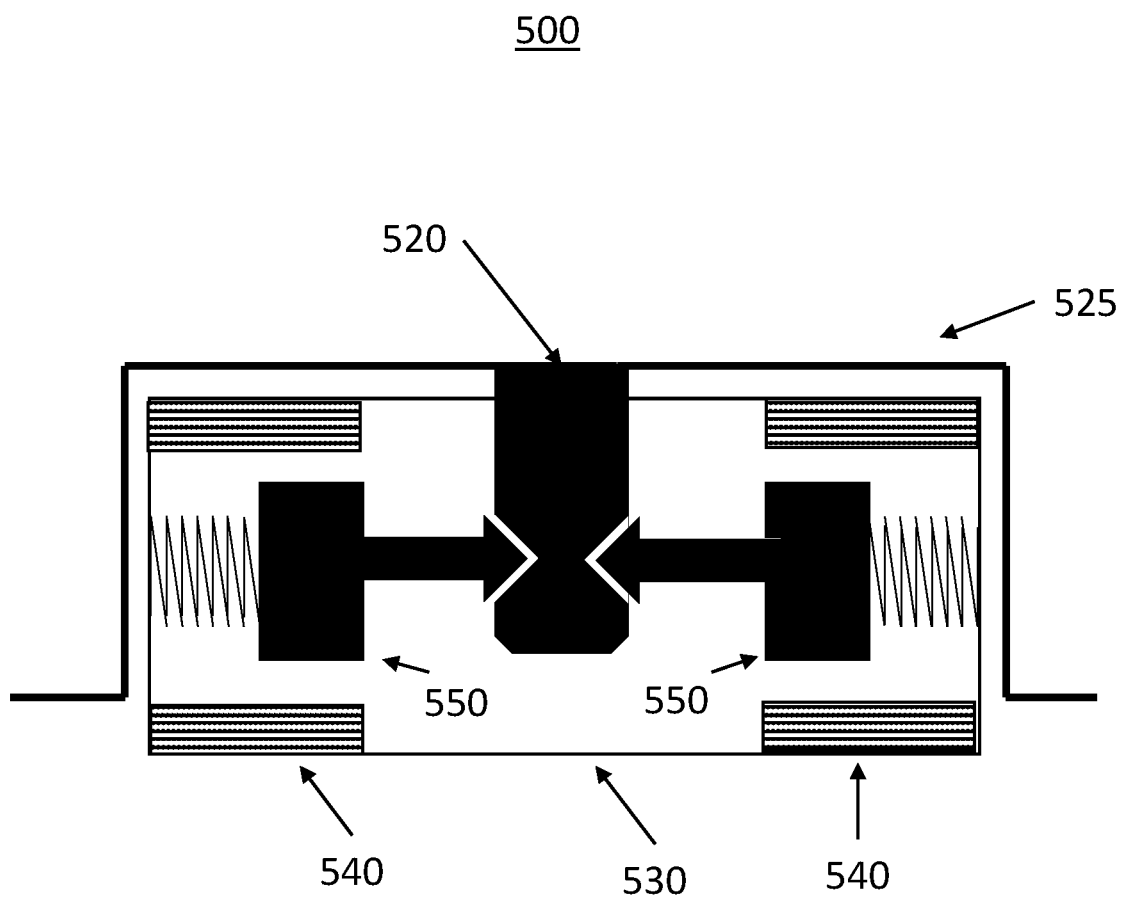
FIG. 5 shows another exemplary latch mechanism for multidirectional opening storage cover according to another exemplary embodiment of the present disclosure.

Turning now to FIG. 5, another exemplary latch mechanism 500 according to an exemplary embodiment of the present disclosure is shown. The exemplary latch mechanism 500 is operative to function as a latch and a hinge to accommodate hinged opening of the storage compartment. A rectangular portion 530 of the latch is attached to the storage compartment wall and engages a rectangular slot 525 in the storage compartment cover. Within the rectangular slot 525 is a structure 520 extended from the bottom of the rectangular slot 525. The structure 520 further includes recessed features for engaging two latch pins 550 housed in the rectangular structure 530, one on each side of the structure 520. The latch pins 550 are operative to be retracted in response to a depression of one of the strap switches. In an exemplary embodiment, the latch pins 550 may be retracted by a force provided by one or more magnetic coils.

When the strap button is pressed, the latch pins 550 are retracted away from the laterally extended features and then the torsional spring gets arrested in the toothed clutch due to spring load. This action will occur at pressed and adjacent latches. When the storage is force closed, a ball or sloped tip of the latch pins 550 will be pushed back past a sloped top portion of the structure 530 and will engage a recess in the side of the structure 530 and be returned to the latched position.

Figure 6:
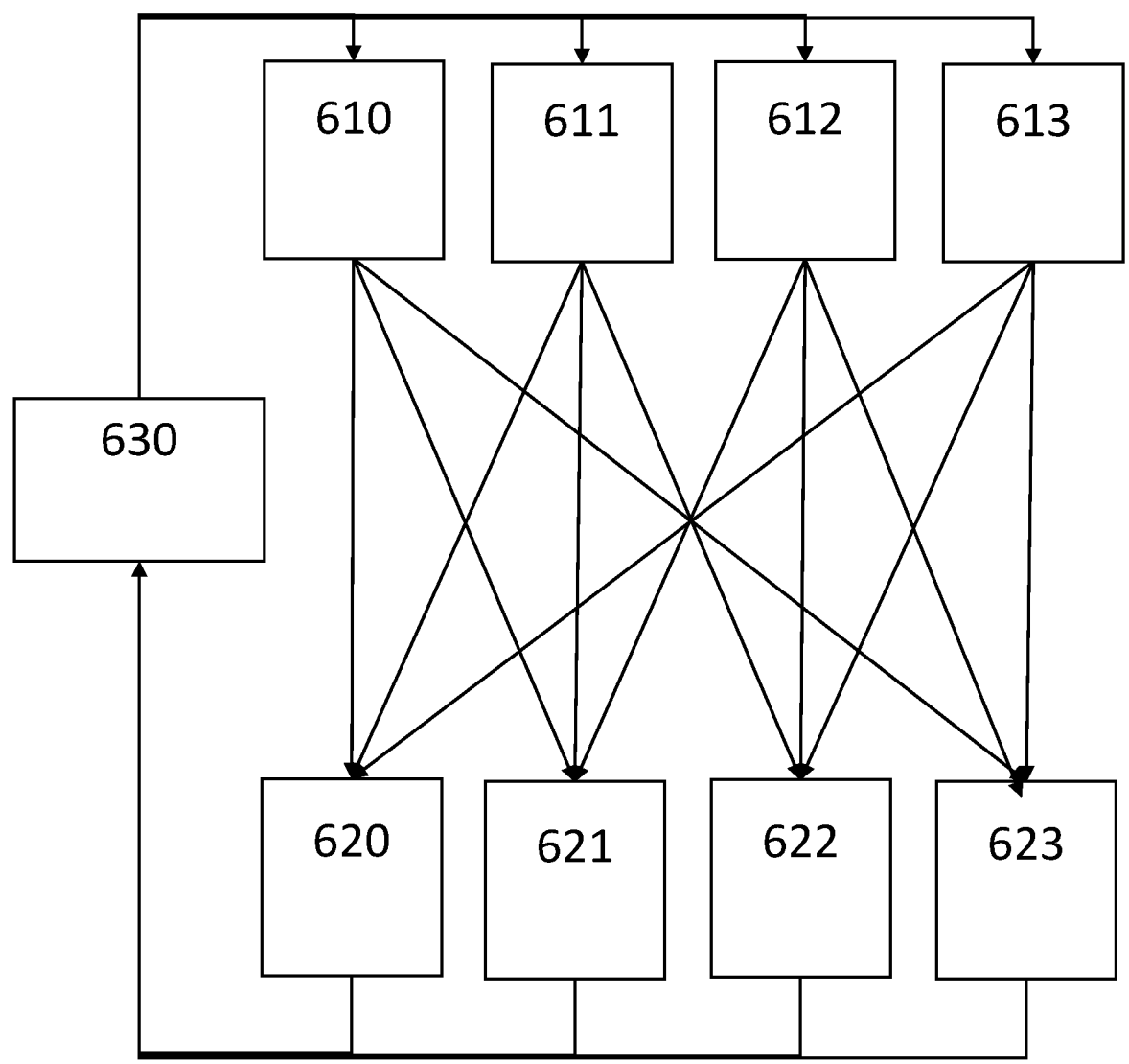
FIG. 6 shows a block diagram illustrating a system for multidirectional opening storage cover according to another exemplary embodiment of the present disclosure.

Turning now to FIG. 6, a system 600 for a multidirectional opening storage cover according to an exemplary embodiment of the present disclosure is shown. The exemplary system 600 includes a front switch 610, a left switch 611, a rear switch 612, a right switch 613, a front latch 620, a left latch 621, a rear latch 622, a right latch 623, and a power supply 630. When the front switch 610 is depressed on the storage cover, a current flow is routed from the power supply 630 through the front switch 610 and then through the front latch 620, left latch 621, and right latch 623. This routed current is then operative to disengage the front latch 620, left latch 621, and right latch 623 to facilitate opening the storage cover from the front side with the cover hinged on the rear side.

When the left switch 611 is depressed on the storage cover, a current flow is routed from the power supply 630, through the left switch 611, and then through the front latch 620, left latch 621, and rear latch 622. This routed current is then operative to disengage the front latch 620, left latch 621, and rear latch 622 to facilitate opening the storage cover from the left side with the cover hinged on the right side.

When the right switch 613 is depressed on the storage cover, a current flow is routed from the power supply 630, through the right switch 613, and then through the front latch 620, right latch 623, and rear latch 622. This routed current is then operative to disengage the front latch 620, right latch 623, and rear latch 622 to facilitate opening the storage cover from the right side with the cover hinged on the left side.

When the rear switch 613 is depressed on the storage cover, a current flow is routed from the power supply 630, through the rear switch 613, and then through the right latch 623, left latch 621, and rear latch 622. This routed current is then operative to disengage the right latch 623, left latch 621, and rear latch 622 to facilitate opening the storage cover from the rear side with the cover hinged on the front side.

Figure 7:
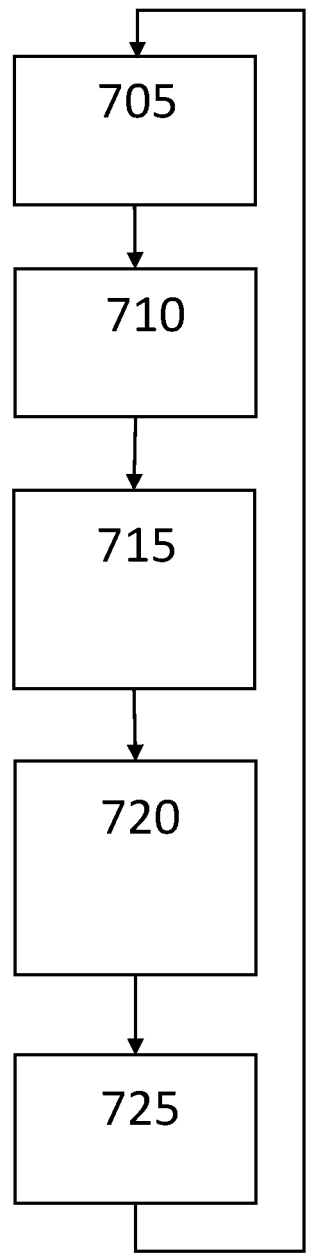
FIG. 7 shows a flow chart illustrating a method for multidirectional opening storage cover according to another exemplary embodiment of the present disclosure.

Turning now to FIG. 7, a method 700 for an exemplary multidirectional opening storage cover 700 according to an exemplary embodiment of the present disclosure is shown. The method is first operative to receive 705 an input from a user indicative of a desired access side of a storage compartment within a vehicle. The user input may be received from a button or the like located on an edge of a storage compartment cover on the desired access side of the storage compartment. For example, when a vehicle occupant wishes to access the storage compartment from the front side, the button depressed by the vehicle occupant may be on the front side of the storage compartment cover.

The method is next operative to disengage 710 a latch on the desired side of the storage compartment in response to the user input. The latch may be disengaged by coupling an electrical current to the latch, thereby activating a magnetic coil, switch or the like to disengage a latch pin or similar feature from the latch, thereby cause a top portion of the latch connected to the storage compartment cover to become disengaged from a lower portion of the latch connected to the storage compartment wall or the like.

The method is next operative to disengage 715 a clockwise adjacent latch from the desired access side. This clockwise adjacent latch may similarly be disengaged by coupling an electric current to the latch.

The method is next operative to disengage 720 a counterclockwise adjacent latch from the desired access side. This counterclockwise adjacent latch may similarly be disengaged by coupling an electric current to the latch. According to this exemplary embodiment, disengagement of this counterclockwise latch will enable the storage compartment cover to be opened from the desired access side and hinged on the side opposite of the desired access side.

Finally, in response to the access cover being closed by a vehicle occupant, the method is then operative to reengage 725 all of the latches to secure the storage compartment cover to the storage compartment and to return to wait to receive 705 a subsequent user input.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. An apparatus comprising:
   a storage cover having a right side, a left side, a front side, and a rear side;
   a first latch on the left side of the storage cover;
   a second latch on the front side of the storage cover;
   a third latch on the right side of the storage cover;
   a fourth latch on the rear side of the storage cover;
   a first switch on the left side of the storage cover operative to disengage the first latch, second latch and fourth latch in response to an activation of the first switch by a user;
   a power supply for providing an electrical current and wherein the electrical current is coupled to the first latch, second latch and fourth latch in response to the activation of the first switch; and
   a second switch on the right side of the storage cover operative to disengage the second latch, the third latch and the fourth latch in response to an activation of the second switch by the user.

2. The apparatus of claim 1 wherein the storage cover is operative to rotate around the third latch in response to a disengagement of the first latch, the second latch and the fourth latch.

3. The apparatus of claim 1 wherein the storage cover is operative to rotate around the first latch in response to a disengagement of the third latch, the second latch and the fourth latch.

4. The apparatus of claim 1 wherein the storage cover further includes an armrest and wherein the storage cover is in a vehicle cabin.

5. The apparatus of claim 1 wherein the wherein activation of the first switch is operative to retract a first latch pin within the first latch, a second latch pin within the second latch and a fourth latch pin within the fourth latch and the storage cover being operative to rotate on a third latch pin within the third latch.

6. The apparatus of claim 1 wherein the storage cover is part of a storage compartment located within a center console in a vehicle cabin.

7. The apparatus of claim 1 further including an electrical coupler between a vehicle center console and the storage cover for coupling the electrical current to the first switch and the second switch.

8. The apparatus of claim 1 wherein the first switch comprises a strap switch positioned under a material covering on the storage cover.

9. A method comprising:
   receiving a user input via a switch on a first side of a storage compartment lid; and
   disengaging a first latch on the first side of the storage compartment lid, a second latch on a second side of the storage compartment lid and a third latch on a third side of the storage compartment lid in response to the user input, wherein the storage compartment lid is operative for a hinged rotation on a fourth side of the storage compartment lid wherein the switch is operative to couple an electrical current to the first latch, the second latch and the third latch in response to the user input.

10. The method of claim 9 further including reengaging the first latch, second latch and third latch in response to a user closing the storage compartment lid.

11. The method of claim 9 wherein the storage compartment lid is part or a storage compartment within a vehicle cabin.

12. The method of claim 9 wherein the switch comprises a strap switch located within the storage compartment lid.

13. The method of claim 9 wherein disengaging the first latch includes retracting a first latch pin and a second latch pin in response to the user input.

14. The method of claim 9 wherein the switch is operative to couple the electrical current from a power supply to the first latch, the second latch and the third latch in response to the user input.

15. A storage compartment cover for use within a vehicle cabin comprising:
- a first switch on a first side of the storage compartment cover,
- a first latch on the first side of the storage compartment cover;
- a second latch on a second side of the storage compartment cover;
- a third latch on a third side of the storage compartment cover;
- a fourth latch on a fourth side of the storage compartment cover; and
- a power supply for suppling a voltage to the first latch, the second latch and the third latch in response to an activation of the first switch and wherein the storage compartment cover is operative to rotate around the fourth latch in response to a disengagement of the first latch, the second latch, and the third latch in response to the voltage.

16. The storage compartment cover for use within a vehicle cabin of claim 15 wherein the voltage is coupled from the power supply to the first latch, the second latch and the third latch from a vehicle center console to the storage compartment cover via an electrical coupler.

17. The storage compartment cover for use within a vehicle cabin of claim 15 wherein the first switch is a strap switch located within the storage compartment cover.

18. The storage compartment cover for use within a vehicle cabin of claim 15 wherein the first latch is disengaged by retracting a latch pin in response to the voltage.

* * * * *